United States Patent
Bolz (10) Patent No.: US 10,281,057 B2
(45) Date of Patent: May 7, 2019

(54) CIRCUIT ARRANGEMENT FOR INDUCTIVELY HEATING AT LEAST ONE FUEL INJECTOR VALVE, AND FUEL INJECTOR ARRANGEMENT COMPRISING SUCH A CIRCUIT ARRANGEMENT

(71) Applicant: CONTINENTAL AUTOMOTIVE GMBH, Hannover (DE)

(72) Inventor: Stephan Bolz, Ruhpolding (DE)

(73) Assignee: Continental Automotive GmbH, Hannover (DE)

( * ) Notice: Subject to any disclaimer, the term of this patent is extended or adjusted under 35 U.S.C. 154(b) by 659 days.

(21) Appl. No.: 14/424,658

(22) PCT Filed: Aug. 8, 2013

(86) PCT No.: PCT/EP2013/066640
§ 371 (c)(1),
(2) Date: Feb. 27, 2015

(87) PCT Pub. No.: WO2014/032932
PCT Pub. Date: Mar. 6, 2014

(65) Prior Publication Data
US 2015/0226351 A1    Aug. 13, 2015

(30) Foreign Application Priority Data

Aug. 28, 2012    (DE) .................. 10 2012 215 257

(51) Int. Cl.
*F16K 49/00*    (2006.01)
*F02D 41/20*    (2006.01)
(Continued)

(52) U.S. Cl.
CPC ............ *F16K 49/002* (2013.01); *F02D 41/20* (2013.01); *H05B 6/06* (2013.01);
(Continued)

(58) Field of Classification Search
CPC ............. F02D 41/20; F02D 2041/2006; F02D 2041/0072; F02D 2041/0075;
(Continued)

(56) References Cited

U.S. PATENT DOCUMENTS 3,506,907 A    4/1970    Porterfield et al.
4,755,648 A    7/1988    Sawa
(Continued)

FOREIGN PATENT DOCUMENTS

CN    1196160 A    10/1998
CN    101390445 A    3/2009
(Continued)

*Primary Examiner* — Ibrahime A Abraham
*Assistant Examiner* — John J Norton
(74) *Attorney, Agent, or Firm* — Laurence A. Greenberg; Werner H. Stemer; Ralph E. Locher (57) ABSTRACT

A circuit configuration for inductively heating at least one fuel injection valve includes a power-transistor full-bridge circuit which acts as a driver for operating a series resonant circuit at an alternating voltage at or near the resonant frequency. The series resonant circuit includes a heater coil on which the resulting voltage can be significantly higher than the supply voltage. The power that can be fed to the heater coil can be modified or controlled by changing the frequency or the duty factor of the control signals of the switching elements of the bridge circuit. A fuel injection valve and methods for operating the circuit configuration are also provided.

4 Claims, 5 Drawing Sheets

(51) Int. Cl.
*H05B 6/06* (2006.01)
*F02M 53/06* (2006.01)

(52) U.S. Cl.
CPC .................. *F02D 2041/201* (2013.01); *F02D 2041/2006* (2013.01); *F02D 2041/2072* (2013.01); *F02D 2041/2075* (2013.01); *F02M 53/06* (2013.01)

(58) Field of Classification Search
CPC ......... F02D 2041/202; F02D 2041/201; H05B 6/06; F16K 49/002; F02M 53/06
USPC ....... 219/660, 661; 307/104, 140–141.8, 143
See application file for complete search history.

(56) References Cited

U.S. PATENT DOCUMENTS

| | | | |
|---|---|---|---|
| 6,046,442 A | 4/2000 | Kawamura et al. | |
| 6,249,418 B1 | 6/2001 | Bergstrom | |
| 6,880,530 B2 | 4/2005 | Oyama et al. | |
| 6,919,651 B2 * | 7/2005 | Bolz | H03K 17/08142 307/104 |
| 7,397,150 B2 * | 7/2008 | Grossmann | H02P 7/04 307/140 |
| 8,461,723 B2 * | 6/2013 | Kojima | H02M 7/53871 307/104 |
| 8,796,602 B2 | 8/2014 | Miyauchi et al. | |
| 2013/0068758 A1 | 3/2013 | Gfeller et al. | |

FOREIGN PATENT DOCUMENTS

| | | |
|---|---|---|
| DE | 3415967 A1 | 11/1984 |
| DE | 3711645 C1 | 12/1988 |
| DE | 102010063112 A1 | 6/2012 |
| EP | 0852452 A1 | 7/1998 |
| EP | 1408221 A2 | 4/2004 |
| EP | 2391182 A1 | 11/2011 |
| WO | 0045403 A1 | 8/2000 |
| WO | 2011113660 A1 | 9/2011 |
| WO | 2012080009 A1 | 6/2012 |

* cited by examiner

CIRCUIT ARRANGEMENT FOR INDUCTIVELY HEATING AT LEAST ONE FUEL INJECTOR VALVE, AND FUEL INJECTOR ARRANGEMENT COMPRISING SUCH A CIRCUIT ARRANGEMENT

BACKGROUND OF THE INVENTION

Field of the Invention

Circuit arrangement for inductively heating at least one fuel injection valve and fuel injection valve arrangement comprising such a circuit arrangement and method for operating a circuit arrangement and a fuel injection valve arrangement The invention relates to a circuit arrangement for inductively heating at least one fuel injection valve comprising a first controllable switching element, which is connected between the positive terminal of a supply voltage and a first node, comprising a second controllable switching element, which is connected between the first node and the negative terminal of the supply voltage, comprising a third controllable switching element, which is connected between the positive terminal of the supply voltage and a second node, comprising a fourth controllable switching element, which is connected between the second node and the negative terminal of the supply voltage, and comprising a first heater coil of the at least one injection valve, said first heater coil being electrically connected between the first node and the second node.

Such a full-bridge power output stage, also referred to as H bridge, which is realized by interconnecting the four controllable switching elements is described in DE 34 15 967 A1 for driving an inductive heater for ferromagnetic materials.

In order to generate an AC signal, as is required for inductive heating, periodically the first and fourth transistors are switched on and the second and third transistors are switched off, and vice versa.

The voltage present at the heater coil, which can be represented by its winding inductance and its effective resistance, has a rectangular wave form with a peak value corresponding to the supply voltage. The alternating current flowing in this case is approximately triangular; its value is determined by the supply voltage, the switching duration and the winding inductance and the effective resistance.

For low values for the effective resistance, the following applies:

$$dI/dt = U/L,$$

where dI/dt is the rate of change of the heater current at a given voltage U (=Vbat) and inductance (L).

It is immediately clear from this relationship that either the voltage needs to be raised (which is only possible with considerable additional financial outlay in a motor vehicle owing to the 12V vehicle electrical distribution system voltage, however), the inductance needs to be low (in this case both design-based limits and limits which are given by the magnetic circuit of the heater are set) or the duration of the switchover phases needs to be extended (which corresponds to a low frequency, but this is limited by the functional principle of inductive heating) in order to achieve a high current value.

In a test in this regard, a heating power of at best 50 to 100 W could be achieved with a technically sensible design in respect of heater inductance and switching duration using a slightly reduced supply voltage, as is generally available in a motor vehicle. It should also be pointed out that the high harmonic content of the heater current as result of the triangular waveform noticeably impairs the overall efficiency of the system. Owing to the low AC voltage, the peak value of which corresponds to the supply voltage, a very high current is required in order to achieve a heater power of, for example, 200 W, which is required for effective heating of the fuel.

Since the heater winding is connected to the power electronics via feedlines, said feedlines need to be designed with a correspondingly large cross section, which in turn results in additional costs. It is particularly important that the self-inductance of the feedlines needs to be kept as low as possible since this self-inductance is in series with the heater inductance and impedes the buildup of alternating current. In this case, the following applies: the lower the heater inductance is and the higher the heater currents are, the more serious the influence of the line inductance will be.

BRIEF SUMMARY OF THE INVENTION

The object of the invention is a circuit arrangement which achieves a sufficiently high heating power with as low production costs as possible. Furthermore, the alternating current flowing into the feedlines to the heat inductances should have a harmonic content which is as low as possible in order to minimize the emission of electromagnetic interference signals. It should also be possible to vary the power supplied to the heaters within a wide range with the aid of a suitable operating method. Furthermore, it should be possible to determine the inductance of the heater winding in order to derive from this a measure for the actual temperature in the heater, which can in turn be used as actual variable for heater temperature regulation. A further aim of the invention is a fuel injection valve arrangement comprising a plurality of injection valves to be heated, which results in as low production costs as possible.

The object is achieved according to the invention in the case of a circuit arrangement of the generic type by virtue of the fact that a first capacitor is connected in series with the first heater coil between the nodes.

By virtue of an extension by a single capacitor, the H bridge arrangement can be extended to form a circuit arrangement with series resonance. The value of the resonant capacitor should in this case be selected such that, together with the heater inductance, a natural frequency results which is matched to the magnetic requirements of the heater. A typical value for the resonant frequency in the case of the fuel injection valves under consideration here is in the range from 50 to 60 kHz. Determining factors are in this case magnetic material properties, wall thicknesses of the valve, magnetic penetration depths, etc. The frequency of the drive signals and, following on from this, the duration of the switch-on and switch-off durations of said signals in this case needs to be matched to this natural frequency.

By introducing the resonant capacitor, a series resonant circuit which is damped by the effective resistance is produced in conjunction with the heater inductance. Although the field voltage generated between the nodes only has a value corresponding to the supply voltage, the voltage resulting at the heater is substantially higher.

In order to now achieve a required heating power of 200 W, for example, a much lower current is required owing to the higher voltage.

In an advantageous development of the circuit arrangement according to the invention, a fifth controllable switching element is connected electrically between the positive terminal of the supply voltage and a third node, and a sixth controllable switching element is connected electrically between the third node and the negative terminal of the supply voltage.

A seventh controllable switching element is connected electrically between the positive terminal of the supply voltage and a fourth node, and an eighth controllable switching element is connected electrically between the fourth node and the negative terminal of the supply voltage. A second series circuit comprising a second heater coil of a second injection valve and a second capacitor is connected electrically between the second and third nodes. A third series circuit comprising a third heater coil of a third injection valve and a third capacitor is connected electrically between the third and fourth nodes, and a fourth series circuit comprising a fourth heater coil of a fourth injection valve and a fourth capacitor is connected electrically between the fourth and first nodes.

A typical motor vehicle engine has a plurality of cylinders, for example four or six. Since each cylinder is provided with a fuel injection valve, correspondingly four or six heaters are required. This necessitates the use of four or six H bridges for operating the heaters. Owing to the connection according to the invention of output stages and heaters and suitable driving of the output stages, it is possible to halve the number of output stages in a four-cylinder engine and in this way to reduce costs.

In a further advantageous development of the circuit arrangement according to the invention, in each case one diode is connected in parallel with each switching element, and which diodes are all polarized in the reverse direction with respect to the supply voltage.

As result, the decay of a magnetic field stored in the heater coil is possible without the previously switched-off switching elements needing to be switched on. When using power field-effect transistors, these diodes are usually provided, depending on the technology, as substrate diodes.

The object is also achieved by a fuel injection valve arrangement comprising a circuit arrangement according to the invention, in which each of the heater coils and the capacitor assigned thereto are arranged in each case in one fuel injection valve and in which the series circuits comprising the respective heater coils and the capacitors assigned thereto are connected in series with one another.

Owing to the arrangement of the capacitors in the fuel injection valves and the series circuit comprising the series circuits comprising heater coil and capacitor, lines from the H bridges to the fuel injection valves can be dispensed with, which firstly reduces costs and secondly avoids sources of electromagnetic radiation emissions.

The object is furthermore achieved by a method for operating a circuit arrangement according to the invention or a fuel injection valve arrangement according to the invention, in which, by virtue of periodic switching-on and switching-off of the first and fourth switching elements and, in phase opposition to this, of the second and third switching elements or of the first, fourth, fifth and eighth switching elements and, in phase opposition to this, of the second, third, sixth and seventh switching elements at a frequency of the drive signals of the switching elements which corresponds to the resonant frequency, the circuit arrangement or the fuel injection valve arrangement is operated at a maximum heating power and at a reduced heating power when the frequency deviates from the resonant frequency, and the supply of energy to the heater coil(s) is controlled by changing the frequency of the drive signals.

Owing to the use of a drive frequency which deviates from the resonant frequency, a lower voltage amplitude is achieved, with the result that, in this way, the heating power can be set and regulated. For example, in the case of a specific minimum voltage of the motor vehicle electrical distribution system of approximately 9V, the circuit arrangement can be set to a required heating power at the resonant frequency in order to be able to keep the power constant at a relatively high motor vehicle electrical distribution system voltage by virtue of a frequency deviating from said resonant frequency.

This object is also achieved by a further method for operating a circuit arrangement according to the invention or a fuel injection valve arrangement according to the invention, in which, by virtue of periodic switching-on and switching-off of the first and fourth switching elements and, in phase opposition to this, of the second and third switching elements or of the first, fourth, fifth and eighth switching elements and, in phase opposition to this, of the second, third, sixth and seventh switching elements at a frequency of the drive signals of the switching elements which corresponds to the resonant frequency and a duty factor of the drive signals of the switching elements of 50%, the circuit arrangement or the fuel injection valve arrangement is operated at a maximum heating power and at a reduced heating power in the case of a lower duty factor, and the supply of energy to the heater coil(s) is controlled by changing the duty factor of the drive signals.

In this case, the output of heating power is influenced by a change in the ratio of the switch-on and switch-off durations. If the circuit arrangement according to the invention is switched off for longer than it is switched on, a lower heating power is output.

In one development of this method, the switch-off duration of the drive signals corresponds to half the period at the resonant frequency.

As a result, not only the duty factor but also the frequency is changed, with the result that, in this way, the heating power is influenced, wherein a complete polarity reversal of the series resonant circuit can take place owing to the condition for the switch-off duration, and therefore the switching elements can continue to be switched with low losses.

The object is furthermore achieved by a method for operating a circuit arrangement according to the invention or a fuel injection valve arrangement according to the invention, in which the magnet material of a heater coil is selected such that, at the heating temperatures to be reached, a temperature-dependent inductance results, and in which the frequency of the drive signals of the switching elements is tuned in a range around the resonant frequency of the circuit arrangement and, in the process, the maximum of the current in a heater coil is detected in order to determine the present resonant frequency and, from this, the present temperature.

When using a magnet material with a particularly low Curie temperature for the heater, the value of the heater inductance is reduced as this temperature is approached, which results in a temperature-dependent increase in the resonant frequency of the resonant circuit. The frequency of the control signals for the switching elements is changed (tuned) periodically such that, in this case, the resonant frequency is safely reached (sweep). The resonant frequency can then be identified very easily from the maximum of the heater current. In this case, the ratio of the repetition rate and sweep duration is selected such that the increased heating power occurring at the resonant frequency does not substantially change the average heating power.

BRIEF DESCRIPTION OF THE SEVERAL VIEWS OF THE DRAWINGS

The invention will be explained in more detail below with reference to exemplary embodiments with the aid of figures, in which.

DESCRIPTION OF THE INVENTION

Figure 1:
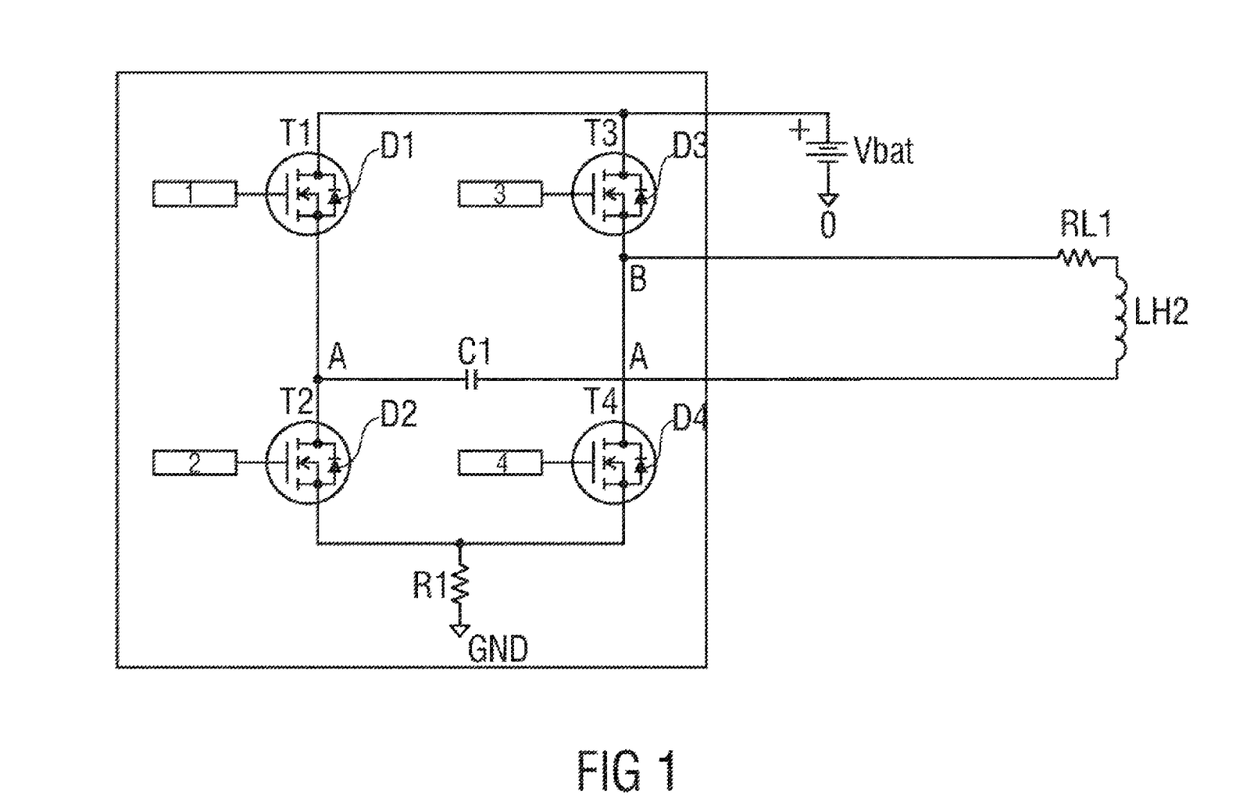
FIG. 1 shows a circuit arrangement according to the invention comprising a series resonant circuit comprising a heater coil and driven by an H bridge.

In the circuit arrangement shown in FIG. 1, a first series circuit comprising a first controllable switching element T1 in the form of a field-effect transistor having a substrate diode D1 and comprising a second controllable switching element T2 likewise in the form of a field-effect transistor having a substrate diode D2 is connected electrically between the positive terminal Vbat and the negative terminal GND of a voltage supply. The node between the two switching elements T1, T2 forms a first node A.

In the same way, a second series circuit comprising a third controllable switching element T3 in the form of a field-effect transistor having a substrate diode D3 and a fourth controllable switching element T4 in the form of a field-effect transistor having a substrate diode D4 is connected electrically between the positive terminal Vbat and the negative terminal GND of the voltage supply. The node between the two switching elements T3, T4 forms a second node B.

In a manner in accordance with the invention, a series resonant circuit comprising a heater coil LH, RL and a first capacitor C is connected between the nodes A, B, wherein the heater coil is represented by its winding inductance LH and its effective resistance RL. The switching elements T1, T2, T3, T4 have control inputs 1, 2, 3, 4. In order to measure the current through the resonant circuit C, LH, RL, a shunt R1 is arranged between the node between the second and third switching elements T2, T3 and the negative terminal GND of the voltage supply.

Figure 2:
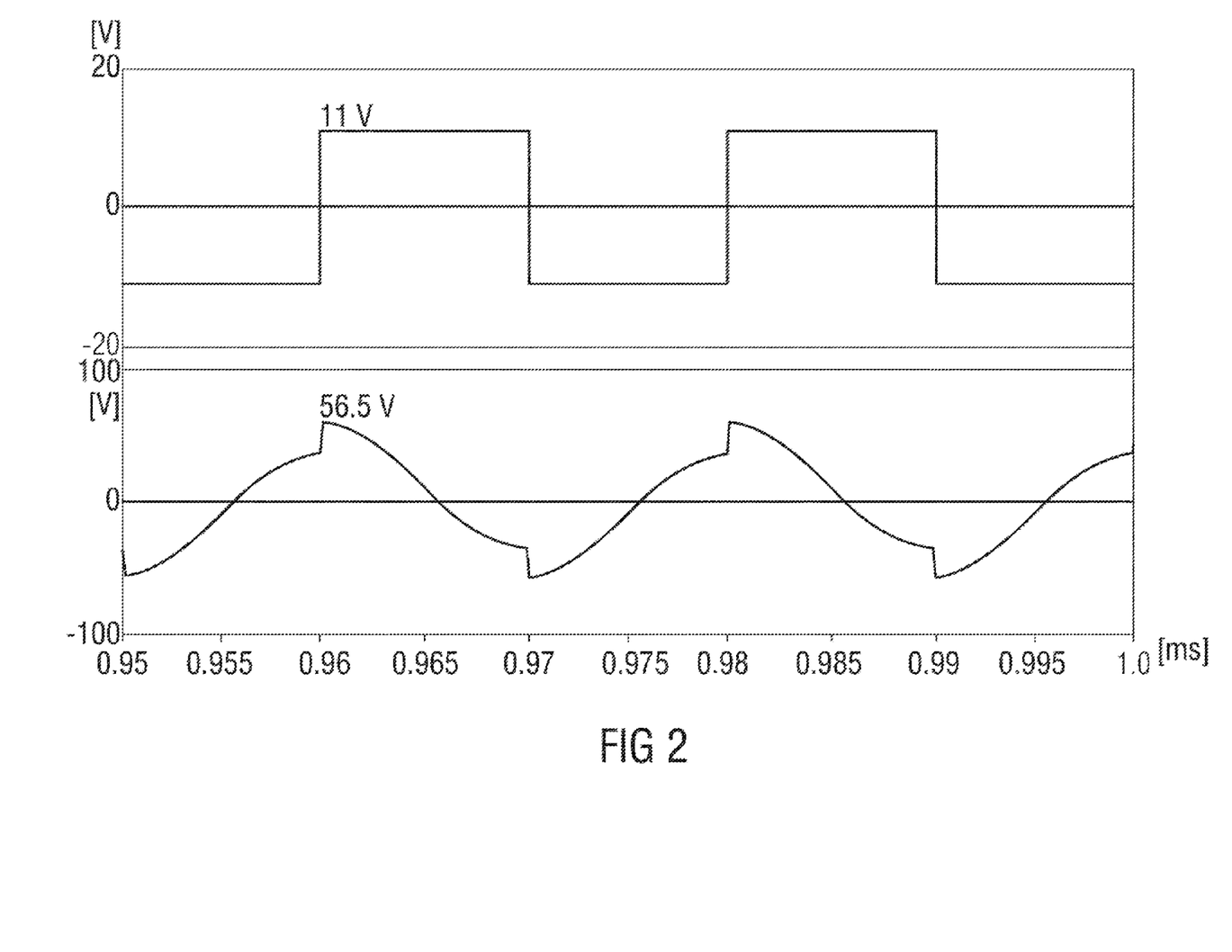
FIG. 2 shows the voltage waveforms between the nodes and at the heater coil.

In order to simulate this circuit arrangement, an inductance of approximately 5 µH which is easy to manufacture has been selected, and the resonant capacitor has a value of 2 µF. The inductance of the feedlines is negligible with respect to the heater inductance LH. The observed voltages and currents are represented in FIG. 2 and show values which can be managed easily technically and enable cost-effective production of the overall system. As can be seen, a peak voltage of 56.5V is present at the series resonant circuit although the supply voltage only has a value of 11V. As a result, it is possible to transmit sufficient power into the heater coil with acceptable current values.

In order to generate the electromagnetic interference signal, the spectral energy density of the common-mode signal on the feedlines to the heater is of critical importance since these lines act as emission antenna. The low-frequency range is also of importance here since even above 100 kHz, maximum permissible interference signal levels are established.

Figure 3:
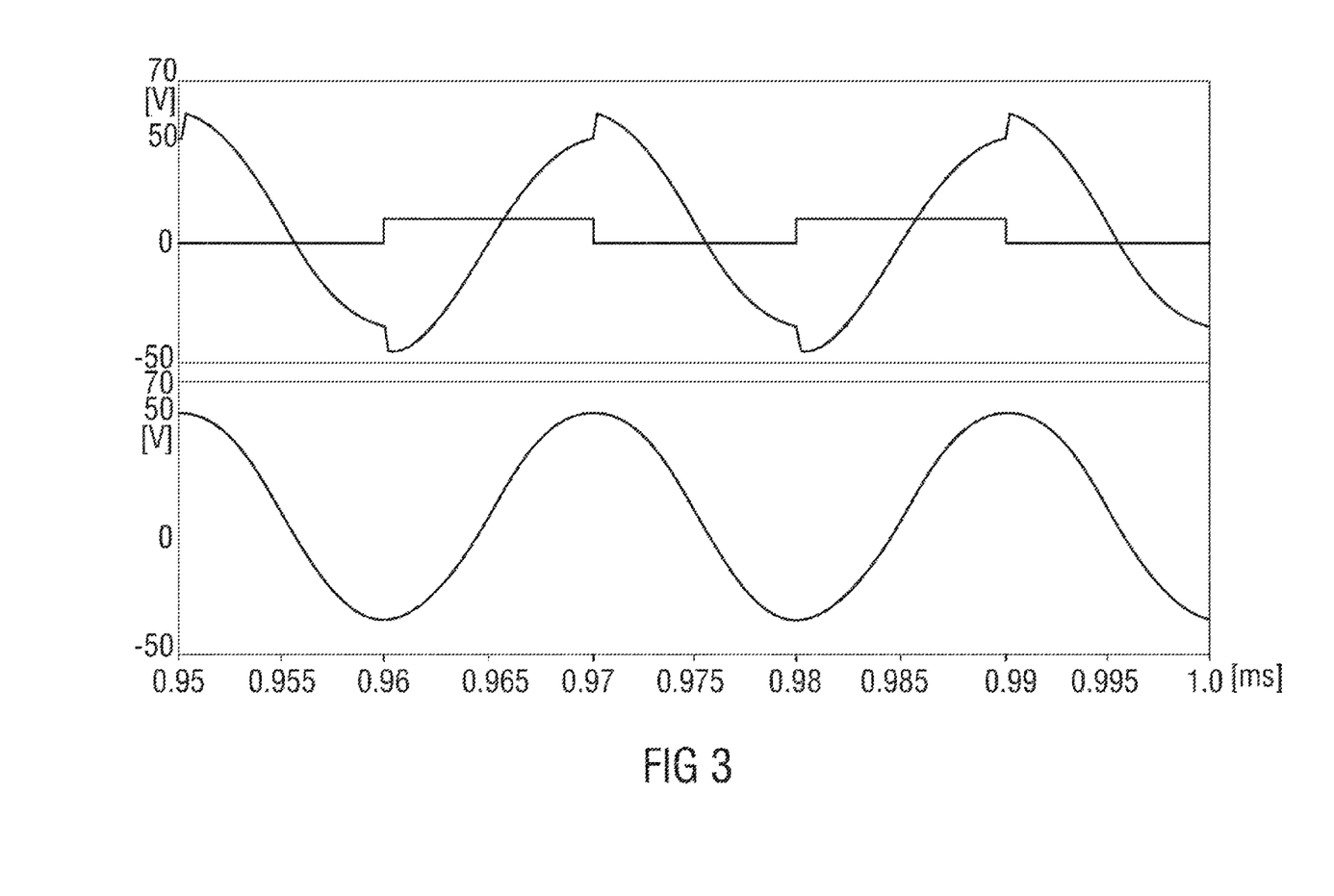
FIG. 3 shows the voltage waveforms at the nodes with respect to reference potential and the common-mode component of the voltage at the heater coil.

In principle, the H bridge has the advantage that its two output signals have opposite phase angles and the signal voltages cancel one another out during switchover, apart from differences in amplitude waveform and time. The signal waveforms at the nodes A and B', wherein the node B' is the node between the capacitor C and the heater coil LH, RL, are very different, as can be seen from FIG. 3, which makes it possible to assume a high interference emission. There, the square-wave voltage in the illustration at the top is the voltage at the node A with respect to the reference potential GND and the sinusoidal voltage with sudden changes in voltage is the voltage at the node B' with respect to the reference potential GND. However, consideration of the common-mode signal demonstrates that the additional amplitude generated by the resonant circuit is a sinusoidal oscillation with a very low harmonic content and therefore does not effect any notable interference emission in the assessed frequency range above 100 kHz.

Control of the heater power can be performed in two ways. A first method according to the invention envisages changing the frequency of the drive signals at the control inputs 1 to 4 of the switching elements T1 to T4. If the resonant circuit is tuned to 50 kHz, a switch-on period of 10 µs results, followed by a switch-off period of 10 µs, i.e. a duty factor of 50%. If the switching periods are shortened, with the same duty factor, the frequency increases and the resonant circuit is operated above its resonant frequency. Correspondingly, the magnification factor of the voltage decreases, which in turn reduces the heater power.

Therefore, the heating power can be reduced continuously, starting from a maximum value. A slight mistuning from 50 kHz to 59 kHz already halves the heating power. With the aid of this power control, it is possible to keep the heating power constant within a wide range, in the case of a varying supply voltage. The heating power can also be reduced when a preset set point temperature is reached in the heater in order to keep this temperature stable.

In order to keep the temperature stable, it is necessary to regulate the temperature to a preset set point value. For this purpose, the actual temperature needs to be determined. In a manner in accordance with the invention, the determination of the heater temperature is performed by determining the resonant frequency.

When using a magnet material for the heater of the fuel injection valve with a particularly low Curie temperature, the value of the heater inductance is reduced as this temperature is approached, which results in a temperature-dependent increase in the resonant frequency of the resonant circuit. There are now several possibilities for determining the resonant frequency.

The frequency of the control signals at the control inputs 1 to 4 of the switching elements T1 to T4 is varied (tuned) periodically such that, in the process, the resonant frequency is safely met (sweep). The resonant frequency can be identified very easily from the maximum of the heater current. In this case, the ratio of the repetition rate and the sweep duration is selected such that the increased heating power occurring at the resonant frequency does not substantially change the average heating power.

There is also a systematic (quadratic) relationship between the supply voltage and the heating power. If the resonant frequency is determined once when the heater is cold and the present supply voltage and the heating power generated in this case are also determined, a reference point is obtained. Starting from this reference point and a measurement of the present supply voltage and the heating power, it is possible to draw a conclusion in respect of the heater temperature. Instead of the heater power, the heater current which can be observed at the shunt R1 (FIG. 1) can also be used as measured variable. The heater temperature thus determined can then be used as actual variable for heater temperature regulation.

In a further driving method, the drive signals at the control inputs 1 to 4 of the switching elements T1 to T4 can be operated at a lower duty factor than 50%. This means that all of the transistors in the H bridge are switched off for a short period of time. Correspondingly, during this period of time, no energy is supplied to the resonant circuit, which in turn results in a reduction in the heating power.

Advantageously, the duration of the switch-off period is 10 μs for the values of the simulation, which corresponds to the polarity-reversal duration of the resonant circuit. An advantage of this method consists in that the polarity-reversal process of the resonant circuit can be detected easily.

In this case, too, this signal can be used for determining the heater temperature and can therefore act as actual value for heater temperature regulation.

A typical motor vehicle engine has a plurality of cylinders, for example four or six. Since each cylinder is provided with a fuel injection valve, correspondingly four or six heaters are required. This necessitates the use of four or six H bridges for operating the heaters. By a suitable connection of output stages and heaters and suitable driving of the output stages, it is possible to dispense with half the output stages in the case of a four-cylinder engine and to reduce costs in this way.

Figure 4:
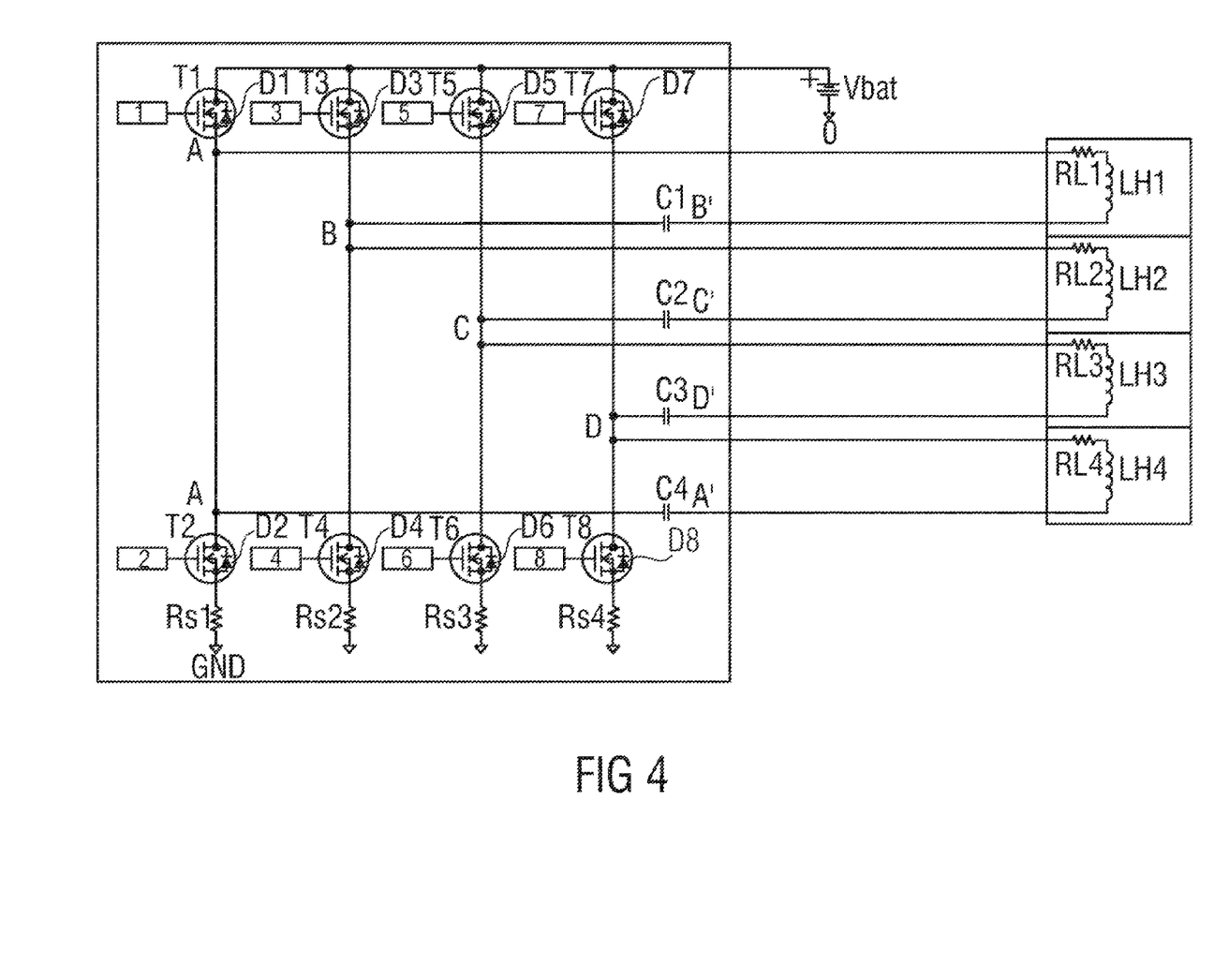
FIG. 4 shows a further circuit arrangement according to the invention comprising series resonant circuits comprising respective heater coils and driven by linked H bridges.

As shown in FIG. 4, starting from a circuit arrangement as shown in FIG. 1, a fifth controllable switching element T5 is connected electrically between the positive terminal of the supply voltage Vbat and a third node C, and a sixth controllable switching element T6 is connected electrically between the third node C and the negative terminal of the supply voltage GND. In addition, a seventh controllable switching element T7 is connected electrically between the positive terminal of the supply voltage Vbat and a fourth node D, and an eighth controllable switching element T8 is connected electrically between the fourth node D and the negative terminal for the supply voltage GND.

A second series circuit comprising a second heater coil LH2 of a second injection valve EV2 and a second capacitor C2 is connected electrically between the second node B and the third node C. A third series circuit comprising a third heater coil LH3 of a third injection valve EV3 and a third capacitor C3 and a fourth series circuit comprising a fourth heater coil LH4 of a fourth injection valve EV4 and a fourth capacitor C4 are connected electrically between the third node C and the fourth node D and between the fourth node D and the first node A, respectively.

The first heater coil LH1 is connected to the nodes A and B, i.e. it is fed by the switching elements T1, T2, T3, T4.

The second heater coil LH2 is connected to the nodes B and C, i.e. it is fed by the switching elements T3, T4, T5, T6.

The third heater coil LH3 is connected to the nodes C and D, i.e. it is fed by the switching elements T5, T6, T7, T8.

The fourth heater coil LH4 is connected to the nodes D and A, i.e. it is fed by the switching elements T7, T8, T1, T2.

The driving of the switching elements T1 to T8 takes place by virtue of the control signals at the control inputs 1 to 8. In this case, the signals at the control inputs 1, 4, 5, 8 always have the same level, and the signals at the control inputs 2, 3, 6, 7 always have the same, opposite level. That is to say that if the signals at the control inputs 1, 4, 5, 8 have a high level, the signals at the control inputs 2, 3, 6, 7 have a low level. Correspondingly, the voltages at the heater coils LH1 and LH4 have a positive value in a first phase and the voltages at the heater coils LH2 and LH3 have at the same time a negative value. The switching elements T1 to T8 should in this case be designed for twice the current-carrying capacity.

Figure 5:
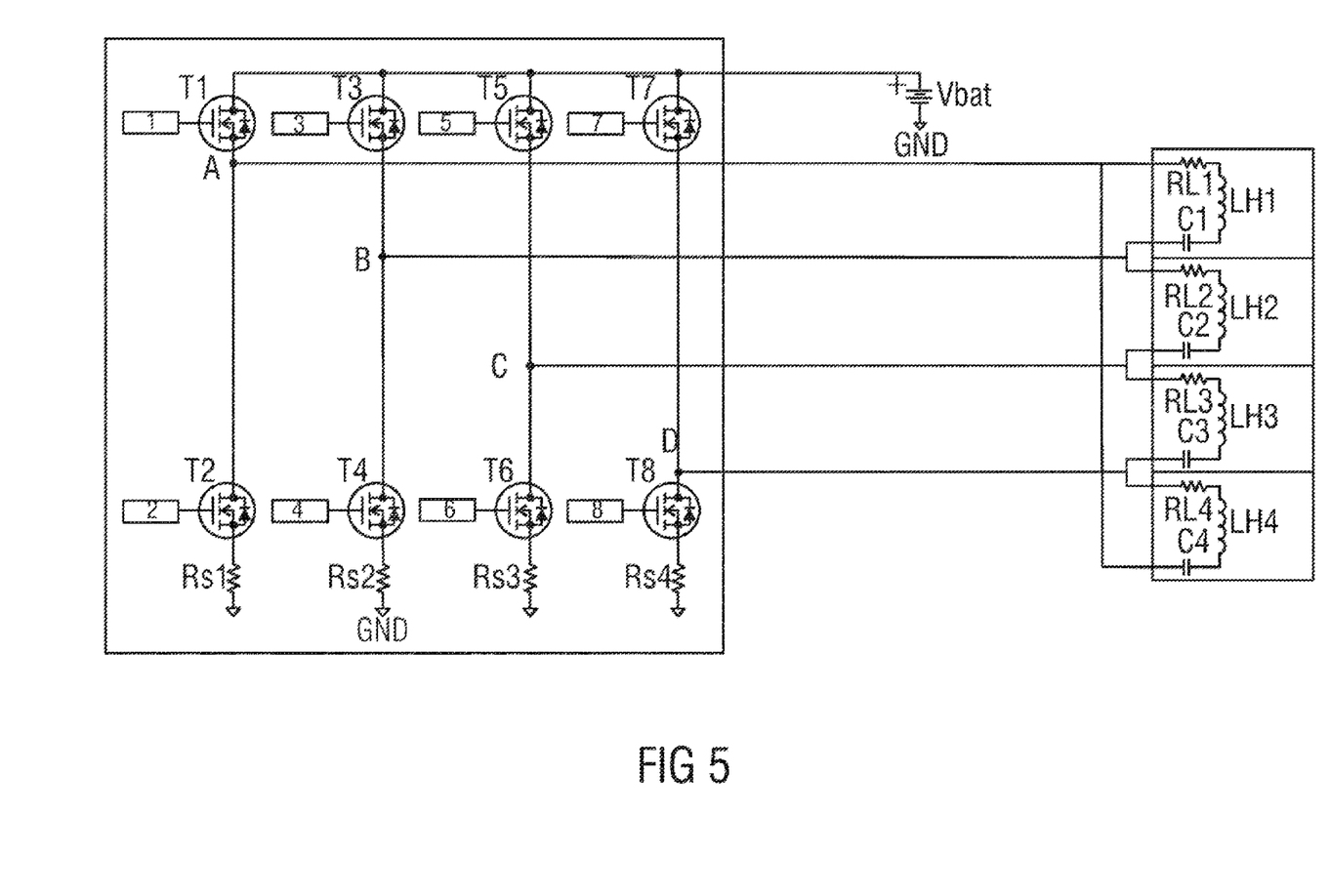
FIG. 5 shows a fuel injection valve arrangement according to the invention comprising resonant circuits arranged in the fuel injection valves.

If, as shown in FIG. 5, the resonant capacitors C1 to C4 are installed in the heaters of the fuel injection valves EV1 to EV4, the number of feedlines can also be halved.

Although additional connections are now required between the fuel injection valves EV1 to EV4, this can be resolved in design terms by installing all of the heaters together in one valve module with integrated heaters, capacitors and connecting lines. This then results in a particularly compact, inexpensive design. It is also advantageous that half of the very expensive (heavy-duty) plugs are no longer required as a result of this arrangement.

The behavior and the driving of the configuration shown in FIG. 5 do not differ from the embodiment illustrated in FIG. 4.

The invention claimed is:

1. A circuit configuration for inductively heating at least one fuel injection valve, the circuit configuration comprising:
   first and second nodes;
   a first controllable switching element connected between a positive terminal of a supply voltage and said first node;
   a second controllable switching element connected between said first node and a negative terminal of the supply voltage;
   a third controllable switching element connected between the positive terminal of the supply voltage and said second node;
   a fourth controllable switching element connected between said second node and the negative terminal of the supply voltage;
   a first heater coil for the at least one injection valve, said first heater coil being electrically connected between said first node and said second node;
   a first capacitor connected in a first series circuit with said first heater coil between said first and second nodes;
   a third node and a fourth node;
   a fifth controllable switching element connected electrically between the positive terminal of the supply voltage and said third node;
   a sixth controllable switching element connected electrically between said third node and the negative terminal of the supply voltage;
   a seventh controllable switching element connected electrically between the positive terminal of the supply voltage and said fourth node;
   an eighth controllable switching element connected electrically between said fourth node and the negative terminal of the supply voltage;
   a second series circuit including a second heater coil for a second injection valve and a second capacitor connected electrically between said second node and said third node;
   a third series circuit including a third heater coil for a third injection valve and a third capacitor connected electrically between said third node and said fourth node; and a fourth series circuit including a fourth heater coil for a fourth injection valve and a fourth capacitor connected electrically between said fourth node and said first node.

2. The circuit configuration according to claim 1, which further comprises diodes each being connected in parallel with a respective one of said switching elements, said diodes each being polarized in the reverse direction with respect to the supply voltage.

3. The circuit configuration according to claim 1, wherein said first, said second, said third, said fourth, said fifth, said sixth, said seventh, and said eighth controllable switching elements are the only controllable switching elements that control said first, said second, said third, and said fourth heater coils.

4. A fuel injection valve configuration, comprising:
a circuit configuration according to claim 1;
fuel injection valves;
said heater coil and said capacitor of each of said series circuits being disposed in a respective one of said fuel injection valves; and
said series circuits including said heater coils and said capacitors being connected in series with one another.

\* \* \* \* \*